E. FUCHS.
SURGICAL AND MEDICAL INSTRUMENT.
APPLICATION FILED JAN. 26, 1920.
1,363,965.  Patented Dec. 28, 1920.
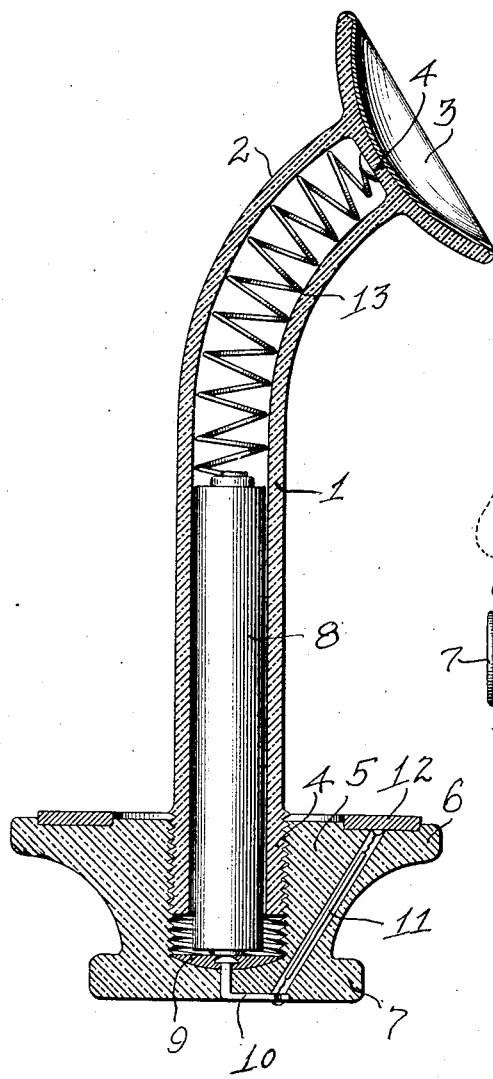
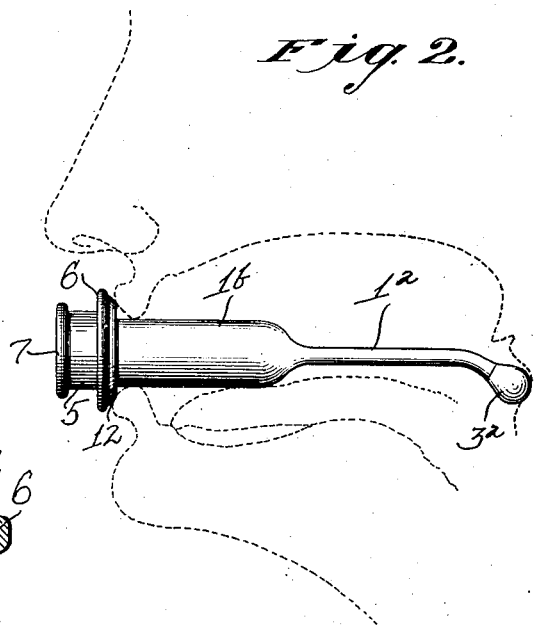

UNITED STATES PATENT OFFICE.

ERNESTO FUCHS, OF GUADALAJARA, MEXICO.

SURGICAL AND MEDICAL INSTRUMENT.

1,363,965.   Specification of Letters Patent.   Patented Dec. 28, 1920.

Application filed January 26, 1920. Serial No. 354,028.

*To all whom it may concern:*

Be it known that I, ERNESTO FUCHS, a citizen of the United States, and a resident of Guadalajara, Mexico, have invented new and Improved Surgical and Medical Instruments, of which the following is a full, clear, and exact description.

The present invention relates to a surgical and medical instrument and has reference more particularly to an instrument for electrically treating the interior of natural or artificial cavities of the human body.

An object of the invention is to provide a safe, compact instrument which may be manufactured at a comparatively modest cost and which is so arranged as to receive and carry the source of stored current which is used in the instrument.

Further objects of the invention will appear upon reference to the accompanying drawing in which, Figure 1 is a vertical section of an instrument constructed in accordance with one form of the invention, and Fig. 2 is a view of a modified form of the instrument illustrating one of its uses.

Referring to the drawing in detail the specific embodiments of the invention herein shown are merely disclosed for purposes of illustration, as the instrument may be made in various shapes to realize the advantages of using the same with different parts of the body which would be benefited by a treatment with the instrument.

One of the important features of the invention is to provide an instrument which is capable of being inserted into a cavity of the human or an animal body with the same arranged so as to include a self contained source of stored current with the contacts in circuit with the source of current, and arranged at opposite ends of the device so that either one of the ends may be selectively used for giving a treatment with either the plus or minus pole of the device.

According to the disclosure in Fig. 1 the instrument comprises a relatively long tubular casing 1 which is slightly curved at one end such for instance as at 2 with the curved end terminating in a cup shaped implement 3, the opposite end 4 of the casing 1 being threaded into a base 5 which is provided with a relatively wide annular flange 6, and with its sides terminating in an annular disk shaped end 7 which is of a smaller diameter than the flange 6. Carried by the casing 1 is the galvanic battery 8 which is of a shape and size as to conform to the diameter of the tubular casing 1. That part of the base 5 illustrating the continuation of the threaded end 4 of the casing 1 is made to support the lower end of the battery on the metal plate 9 which will establish a circuit from the battery through the conductors 10 and 11 to the annular contact plate 12 supported on the annular flange 6. The opposite end of the battery is made to coöperate with the coil spring 13 which is disposed within the tubular casing 1 and confined between the upper end of the battery and the base of the implement 3. This spring aside from maintaining the battery in the casing 1 under compression with the contact made at the metal plate 9 will also serve as a conductor for establishing a circuit through the contact 14 to the metal covering of the implement 3. It is of course to be understood that the tubular casing 1, the base 5 and the form for the metal covering on the implement 3 are all constructed of some suitable non-conducting material.

In realizing the benefits of the instrument the tubular casing 1 with the implement 3 or some other proper implement carried thereby is inserted into the cavity to be treated with a circuit established through the metal covering for the implement 3 and the annular flange plate 12.

As stated heretofore the instrument may be made in various sizes to accommodate the same to different forms of treatment or rather according to the nature of the cavity to be treated. A fair example of this is shown in Fig. 2 in which a round implement 3ª is arranged on the end of the tubular casing 1ª which is of a much smaller diameter than the casing 1, but terminates in an enlarged part such as 1ᵇ with the base 5 constructed with the annular contact plate 12, flange 6, and annular disk shaped end 7. As shown in Fig. 2 the instrument is arranged for treating the throat of a patient and with the same inserted as shown, the current is transmitted from the instrument at the implement 3ª and at the annular contact plate 12 which will bear against the lips of the patient.

Having thus described my invention what I claim as new and desire to secure by Letters Patent is as follows:—

1. An electrotherapeutic instrument, comprising a casing, spaced electrodes mounted exteriorly on the said casing, a battery held removably within the casing and electrically connected with one of the electrodes, and a spring within the casing holding the battery in place and electrically connecting the latter with the other electrode.

2. An electrotherapeutic instrument, comprising a casing having a base and made of an insulating material, electrodes of which one is mounted on the said base and the other on the outer end of the casing, a battery removably held in the said casing and electrically connected with the said base electrode, and a spring within the casing and bearing with one end on the said battery to hold the latter in place to make electric connection with the same, the other end of the spring being electrically connected with the electrode on the outer end of the casing.

3. An electrotherapeutic instrument, comprising a casing provided with a base and made of insulating material, a battery held in the said casing, a contact plate mounted in the base and engaged by one end of the said battery, electrodes of which one is ring-shaped and mounted on the said base and the other is mounted on the outer end of the casing, an electric connection held on the base and connecting the said contact plate with the said base electrode, and a spring held in the casing and bearing with one end on the battery to hold the latter in place in the casing and to make electric connection with the battery, the other end of the spring being connected with the electrode on the outer end of the casing.

ERNESTO FUCHS.